United States Patent
Imai et al.

(10) Patent No.: US 8,521,323 B2
(45) Date of Patent: Aug. 27, 2013

(54) DEVICE AND METHOD FOR ARRANGING VIALS

(75) Inventors: Takafumi Imai, Toyonaka (JP);
Takafumi Ikeda, Toyonaka (JP)

(73) Assignee: Yuyama Mfg. Co., Ltd., Osaka (JP)

( * ) Notice: Subject to any disclaimer, the term of this patent is extended or adjusted under 35 U.S.C. 154(b) by 343 days.

(21) Appl. No.: 12/999,975

(22) PCT Filed: Jun. 17, 2009

(86) PCT No.: PCT/JP2009/061046
§ 371 (c)(1),
(2), (4) Date: Dec. 17, 2010

(87) PCT Pub. No.: WO2009/154236
PCT Pub. Date: Dec. 23, 2009

(65) Prior Publication Data
US 2011/0123306 A1 May 26, 2011

(30) Foreign Application Priority Data
Jun. 20, 2008 (JP) ................................. 2008-161948

(51) Int. Cl.
*G06F 7/00* (2006.01)
*B65B 1/04* (2006.01)

(52) U.S. Cl.
USPC ........... 700/214; 700/216; 700/213; 700/228; 700/215; 700/231; 141/104

(58) Field of Classification Search
None
See application file for complete search history.

(56) References Cited

U.S. PATENT DOCUMENTS

| 6,119,737 | A | * | 9/2000 | Yuyama et al. | ................ | 141/104 |
| 2007/0169439 | A1 | * | 7/2007 | Rice et al. | ........................ | 53/494 |
| 2007/0208457 | A1 | * | 9/2007 | Vollm et al. | ................... | 700/228 |
| 2009/0301603 | A1 |   | 12/2009 | Yuyama |   |   |

FOREIGN PATENT DOCUMENTS

| JP | 11-70901 | 3/1999 |
| JP | 2005-535390 | 11/2005 |
| JP | 2007-314203 | 12/2007 |
| JP | 2009-23731 | 2/2009 |
| WO | WO 2004/014288 A1 | 2/2004 |
| WO | WO 2008156122 A1 * | 12/2008 |

* cited by examiner

*Primary Examiner* — Yolanda Jones
(74) *Attorney, Agent, or Firm* — Jones Day (57) ABSTRACT

There is provided a device and method for arranging a vial, which can efficiently arrange a plurality of vials in the same arrangement place. A device for arranging a vial includes an arm member 150 for sandwiching one vial 1 and a carrying means 58 for carrying the vial 1 sandwiched by the arm member 150 to a vial arranging section 202. A layout of the vials 1 in the vial arranging section 202 can be set according to the number (n) of the vials 1 carried into the same vial arranging section 202. The carrying means 58 can advance and retract the arm member 150 in at least two or more directions in the vial arranging section 202.

9 Claims, 13 Drawing Sheets

DEVICE AND METHOD FOR ARRANGING VIALS

CROSS-REFERENCE TO RELATED APPLICATIONS

This application is a 35 U.S.C §371 national stage filling of International Application No. PCT/JP2009/061046, filed Jun. 17, 2009, the entire contents of which are incorporated by reference herein, which claims priority to Japanese Patent Application No. 2008-161948, filed Jun. 20, 2008, the entire contents of which are incorporated by reference herein.

TECHNICAL FIELD

The present invention relates to a device and a method for arranging vials filled with medicines in a shelf of a medicine filling and dispensing apparatus.

BACKGROUND ART

Vials are containers with a lid for accommodating solid medicines such as tablets, capsulated drugs, etc. In hospitals or drug stores, vials filled with medicines customized for patients are handed over to such patients or their attendants. Conventionally, the tasks of filling vials with medicines and further arranging such vials in predetermined places are manually done by pharmacists. The pharmacist selects one medicine among different types of stocked medicines according to a prescription made by a doctor, counts the quantity of the selected medicine and fills a vial with the selected medicine. Thereafter, the pharmacist arranges the vial in a predetermined place (e.g., shelf) assigned to each patient or hands over the same to the patients.

However, such task of manually selecting the medicine and filling the vial is extremely burdensome. In this regard, the applicants suggested a medicine filling and dispensing apparatus, which automatically performs serial operations from selecting a medicine to filling a vial, as disclosed in Patent Document 1. By utilizing the medicine filling and dispensing apparatus disclosed in Patent Document 1, automation of the task of filling vials with medicines is achieved, thereby realizing an efficient task and preventing occurrence of human mistakes in advance.

Patent Document 1: Japanese Laid-Open Patent Application No. (Hei)11-70901

However, if the medicines cannot be accommodated in one vial due to a large amount or if there are various types of medicines, then the medicines must be provided by numerous vials. However, according to the medicine filling and dispensing apparatus disclosed in the above-mentioned Patent Document 1, vials filled with medicines are sequentially discharged in a row, and thus, two or more vials cannot be arranged in the same shelf. For example, when various types and large amounts of medicines are prescribed, the number of vials to be used increases as much and the shelves for arranging the vials related to the same prescription also increase. Accordingly, operators must remove the vials out of a plurality of the shelves and hand over the vials to the patients. However, if such shelves are interspersed, then mistakes in removing the vials caused by the operator are highly likely to occur. That is, in case the vials must be distributed to and arranged in multiple shelves, such shelves are preferably immediately placed adjacent to one another. However, a higher number of shelves make it difficult to position all the shelves closely to one another. Thus, it is an object of the present invention to provide a device and a method for arranging vials, which can efficiently arrange a plurality of vials in the same arrangement place.

SUMMARY OF THE INVENTION

The invention recited in Claim 1 for achieving the aforementioned object is a vial arranging device, which is provided in a medicine filling and dispensing apparatus having a plurality of vial arranging sections in which a plurality of vials filled with medicines are arranged. The vial arranging device includes an arm member for sandwiching one vial and a carrying means for carrying the vial sandwiched by the arm member to the vial arranging section. A layout of the vials in the vial arranging section is set according to the number of vials to be carried into the same vial arranging section.

According to the invention recited in Claim 1, it is possible to set the layout of the vials in the vial arranging section according to the number of vials to be carried into the same vial arranging section. Thus, one vial or a plurality of vials can be efficiently arranged in the vial arranging section based on prescriptions. Accordingly, the number of vials to be carried into (arranged in) the same vial arranging section increases compared to a prior art vial arranging device. As a result, even when a plurality of vials are used in order to fill the vials with the medicines related to the same prescription, the number of vial arranging sections that are to be used for arrangement decreases compared to the prior art. In this case, filling vials includes both of the following: fully filling a vial with medicines; and leaving a room for accommodation in a vial without fully filling the vial.

The invention recited in Claim 2 is the vial arranging device of Claim 1, wherein the carrying means is configured to advance and retract the arm member in the vial arranging section in at least two or more directions, or wherein the carrying means is configured to advance/retract and move in right and left directions in the vial arranging section.

According to the invention recited in Claim 2, the carrying means can advance and retract the arm member in the vial arranging section in at least two or more directions. Alternatively, the carrying means can advance/retract and move in right and left direction in the vial arranging section. Thus, it is possible to arrange the vial to at least two or more places in the vial arranging section. Accordingly, vials to be arranged later in the vial arranging section do not collide with or contact the vial arranged beforehand. As such, a space within the vial arranging section can be efficiently used without causing the vial arranged beforehand to fall down.

The invention recited in Claim 3 is the vial arranging device of Claim 2, wherein the directions include a central direction in the vial arranging section and another direction that is other than the central direction.

According to the invention recited in Claim 3, the arm member can be advanced and retracted in the central direction of the vial arranging section and in another direction that is other than the central direction. Thus, arrangement of the vials in the vial arranging section can be selected according to the number of vials to be arranged. Accordingly, an efficient use of the space within the vial arranging section can be made.

The invention recited in Claim 4 is the vial arranging device of any one of Claims 1 to 3, wherein the vials arranged beforehand are moved by changing a spacing of the arm member.

According to the invention recited in Claim 4, changing the spacing of the arm member allows the vials arranged beforehand to move. Thus, the vial to be arranged later in the vial arranging section can be easily arranged within the limited space. As such, an efficient use of the space within the vial arranging section can be made.

The invention recited in Claim 5 is the vial arranging device of any one of Claims 1 to 4, wherein when one vial arranging section does not receive all of the vials filled with medicines of a same prescription, another vial arranging section is used.

According to the invention recited in Claim 5, when one vial arranging section does not receive all of the vials filled with medicines of the same prescription, another vial arranging section is used. Thus, the vials are distributed to and arranged in a plurality of the vial arranging sections. Accordingly, even when the number of vials is high, the vials can be arranged in a plurality of the vial arranging sections without failure. When one vial arranging section does not receive all of the vials filled with the medicines related to the same prescription, another vial arranging section adjacent thereto preferably receives the vial. Thus, an efficient use of the space within the vial arranging section according to the present invention can be achieved and a large number of the vials can be collectively handled.

The invention recited in Claim 6 is the vial arranging device of any one of Claims 1 to 5, wherein the vials filled with medicines related to other prescriptions are not mingled in the same vial arranging section.

According to the invention recited in Claim 6, the vials filled with the medicines related to other prescriptions are not mingled in the same vial arranging section. Thus, a human mistake such as mishandling of the vials can be prevented.

The invention recited in Claim 7 is the vial arranging device of any one of Claims 1 to 6, which further comprises a computing means for acquiring a prescription data and computing the quantity of vials needed to be filled with medicines.

According to the invention recited in Claim 7, the vial arranging device further comprises the computing means for acquiring a prescription data and computing the quantity of the vials needed to be filled with medicines to thereby automatically obtain the quantity of the vials. Thus, the quantity of the vials depending on to the prescription can be associated with the vial arranging section for arrangement based on the computed quantity. For example, when a displaying part is provided in the vial arranging section for arrangement, the display part can display the prescription number, a patient's name, the total number of vials, the quantity of remaining vials, etc., thereby eliminating mistakes made by operators such as omissions and mishandling.

The invention recited in Claim 8 is the vial arranging device of any one of Claims 1 to 7, which further comprises a storing means for storing a vial layout corresponding to the number of vials to be arranged in the same vial arranging section and a sequential procedure for arranging the vials by the vial layout.

According to the invention recited in Claim 8, the vial arranging device further comprises the storing means for storing a vial layout corresponding to the number of vials to be arranged in the same vial arranging section and a sequential procedure for arranging the vials by the vial layout. Thus, the vials can be automatically arranged in the vial arranging section without failure. That is, the layout configuration corresponding to the number of vials can be determined in advance and the vials can be rapidly and reliably discharged to and arranged in the vial arranging section.

The invention recited in Claim 9 is a vial arranging method wherein a vial is carried by a carrying means having an arm member for sandwiching the vial and the vial is arranged in a vial arranging section of a medicine filling and dispensing apparatus. The vial arranging method comprises: arranging a second vial next to a vial arranged first; inserting the arm member with a spacing thereof narrowed between both of the vials; spreading the arm member to space apart the vials; and arranging a third vial between the vials.

When carrying out the invention recited in Claim 9, the vials can be arranged in a range wider than a range where the arm member can operate in the vial arranging section while sandwiching the vial. That is, a more efficient use of the limited arrangement space can be made, and thus, arrangement of many vials can be achieved.

The vial arranging device according to the present invention can arrange one vial or a plurality of vials based on a prescription in the vial arranging section with better efficiency. Further, when carrying out the vial arranging method according to the present invention, the vials can be arranged within a range wider than a range where the arm member can operate in the vial arranging section while sandwiching the vial.

DESCRIPTION OF REFERENCE NUMERALS

1 . . . Vial
2 . . . Doors of Keep Shelf
10 . . . User Server
39 . . . Data Managing Part
40 . . . Control Part
43 . . . Memory of Data Managing Part (Storing Means)
44 . . . CPU of Data Managing Part (Computing Means)
57 . . . Vial Grasping part
58 . . . Vial Arranging Device 150 . . . Arm (Arm member)
200 . . . Medicine Filling and Dispensing Apparatus
202 . . . Keep Shelf (Vial arranging section)

DETAILED DESCRIPTION

Figure 1:
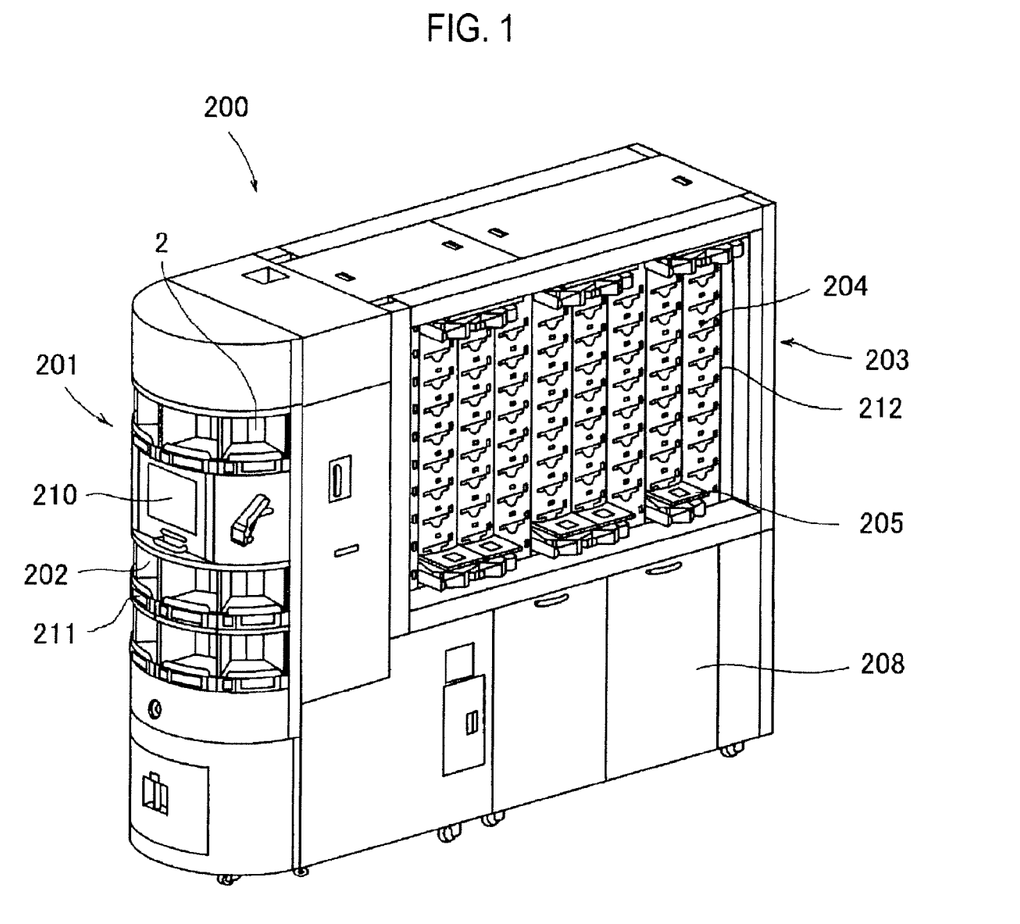
FIG. 1 is a perspective view showing a medicine filling and dispensing apparatus, which may be provided with a vial arranging device according to the present invention.

Description will be first provided on a schematic configuration of a medicine filling and dispensing apparatus 200 including a medicine arranging device according to the present invention. Thereafter, description will be continued on a configuration of the vial arranging device. FIG. 1 is a perspective view showing the medicine filling and dispensing apparatus, which may be provided with the vial arranging device according to the present invention. The medicine filling and dispensing apparatus has functions of placing solid medicines such as tablets, capsulated drugs, etc. into a vial 1 and then arranging the vial in a keep shelf 202 for easy removal. To this end, the medicine filling and dispensing apparatus 200 contains various types of devices and mechanisms.

Specifically, the medicine filling and dispensing apparatus 200 includes the following: a medicine supplying unit 203 provided with a great number of container attaching parts 204; a vial accommodating unit 208 for accommodating empty vials 1 therein; a filling mechanism (not shown) for filling the vial 1 with medicines; and the vial arranging device 58 for carrying the vial 1 filled with medicines to the keep shelf 202.

In the medicine supplying unit 203, medicine storing containers 205 are attached to the container attaching parts 204. In this regard, FIG. 1 shows that the medicine storing containers 205 are attached in a lowermost row. However, in actual usage, the medicine storing containers 205 are attached throughout the entire face of the medicine supplying unit 203. The medicine storing containers 205 store different types of medicines. The medicine attaching part 204 has functions of removing medicines in the predetermined numbers from the medicine storing container 205 and placing the same into the vial 1.

Figure 6:
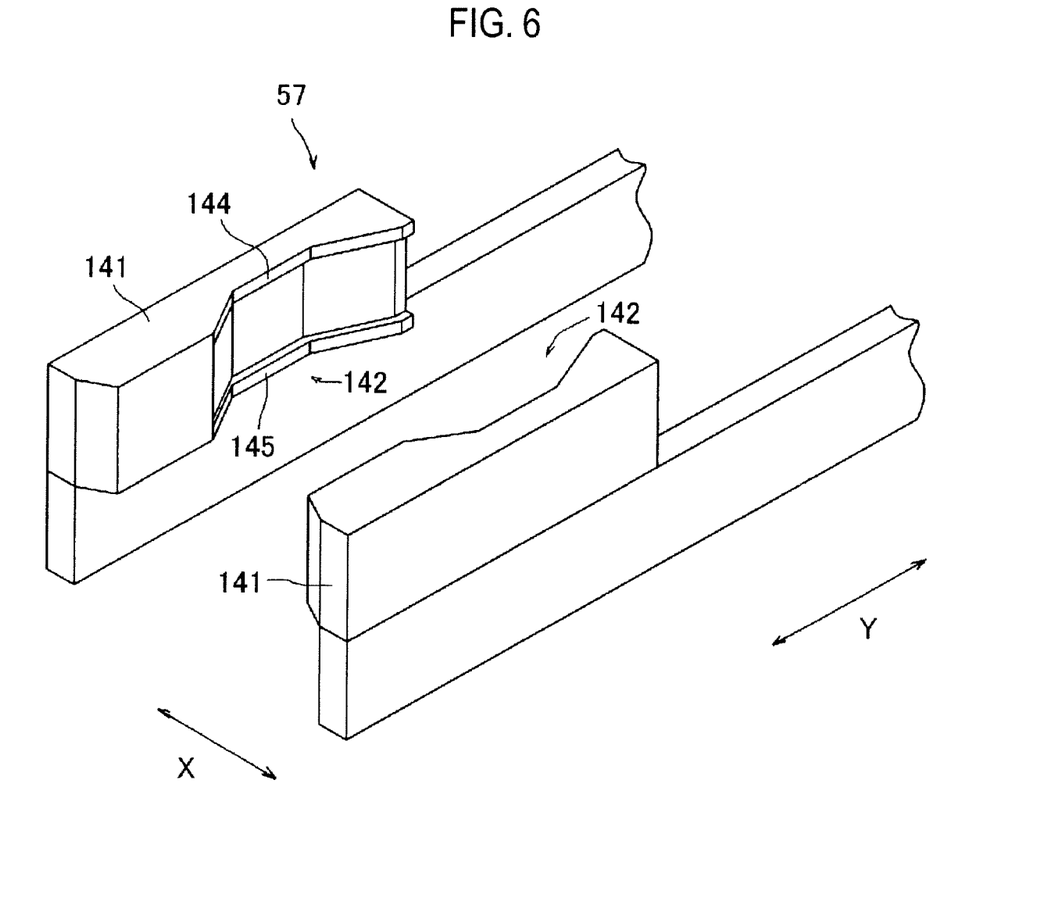
FIG. 6 is a perspective view showing a vial grasping part of a vial transferring device.

To transfer the vial, a vial transferring device is provided in the medicine filling and dispensing apparatus 200. FIG. 6 is a perspective view showing a vial grasping part of the vial transferring device. The vial 1 filled with medicines is transferred within the medicine filling and dispensing apparatus 200 as grasped by the vial grasping part 57 of the vial transferring device.

As shown in FIG. 6, the vial grasping part 57 has two arms 141 and is configured to open and close the arms 141 through an opening and closing mechanism (not shown). That is, the two arms 141 can be moved in a direction indicated by an arrow X and can hold the vial 1 while sandwiching or placing the same therebetween.

The arms 141 employed in this embodiment are configured to be maintained horizontally and to move toward and away from each other. When the arms 141 are viewed from top to bottom, recesses 142 are provided in the arms 141 for sandwiching a portion of a lateral side of the vial 1 therebetween. Further, a portion of the arm 141, which contacts the vial 1 (i.e., the recess 142 of the arm 141), is provided with ribs 144, 145. The ribs 144, 145 are located inside the recess 142 of the arm 141 while extending horizontally. When the two arms 141 are moved in a closing direction to sandwich the vial 1 therebetween, the ribs 144, 145 serve to strengthen a contact pressure between the arms 141 and the vial 1. Thus, such configuration is preferable. Further, the vial grasping part 57 is placed on a rail (not shown) and thus can travel forward and backward in the figure (along a direction of an arrow Y) as sandwiching the vial 1 therein.

Next, the vial accommodating unit 208 is a part storing empty vials 1. The vial is transferred up to a back side (an interior side) of the container attaching part 204 and is then filled with medicines. Specifically, the aforesaid vial transferring device is equipped in the medicine filling and dispensing apparatus 200. The vial transferring device removes the vial 1 out of the vial accommodating unit 208 and then transfers the vial in the vicinity of the back side of the predetermined container attaching part 204 of the medicine supplying unit 203. Further, prior to transferring the vial 1 to the container attaching part 204, a control part 40 (the control part will be described below) acquires a prescription data and writes down a patient's name, a medicine name, etc. on a label and the label is adhered to the vial 1. Also, the container attaching part 204 removes medicines from the medicine storing container 205 and discharges the medicines from its back side, thereby supplying the medicines to the vial 1.

Thereafter, the vial 1 is delivered from the vial transferring device (the vial grasping part 57) to the vial arranging device 58 and then the vial arranging device 58 arranges the vial in the keep shelf 202 (vial arranging section). That is, the vial 1 filled with the predetermined medicines is placed in the keep shelf 202. As shown in FIG. 1, the keep shelf 202 has a substantially fanlike accommodation space. Further, in the keep shelf, side-by-side doors 2 are provided at an opening locating inside the apparatus. The doors 2 are closed at normal times by, for example, a spring mechanism. It is possible that the vial arranging device 58 pushes and opens the doors from the inside of the medicine filling and dispensing apparatus 200 (from the vial arranging device 58). On the contrary, it is impossible to push and open the doors from the outside of the medicine filling and dispensing apparatus 200. The doors 2 do not permit operators to put their hands from the keep shelf 202 into the inside of the medicine filling and dispensing apparatus 200, thereby ensuring safety. The present invention is characterized by the vial arranging device 58 that arranges the vial 1 in the keep shelf 202.

Figure 2:
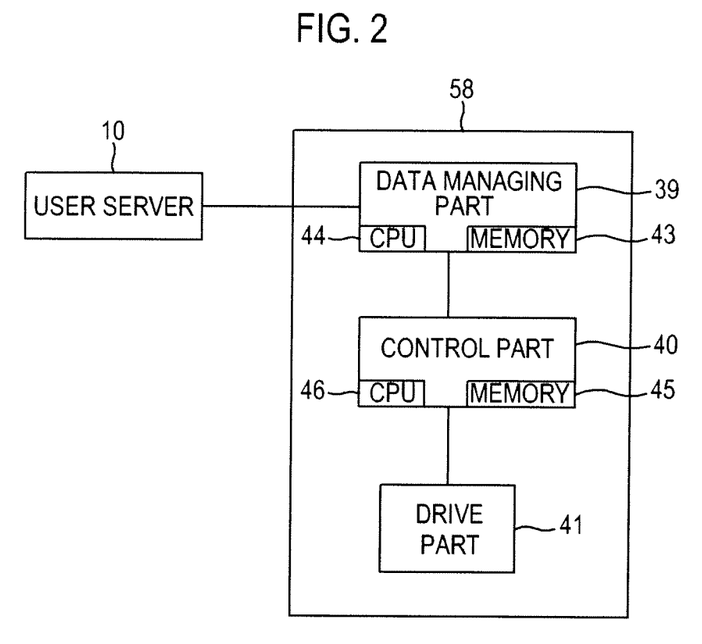
FIG. 2 is a diagram showing a control system of the vial arranging device according to the present invention.
Figure 3:
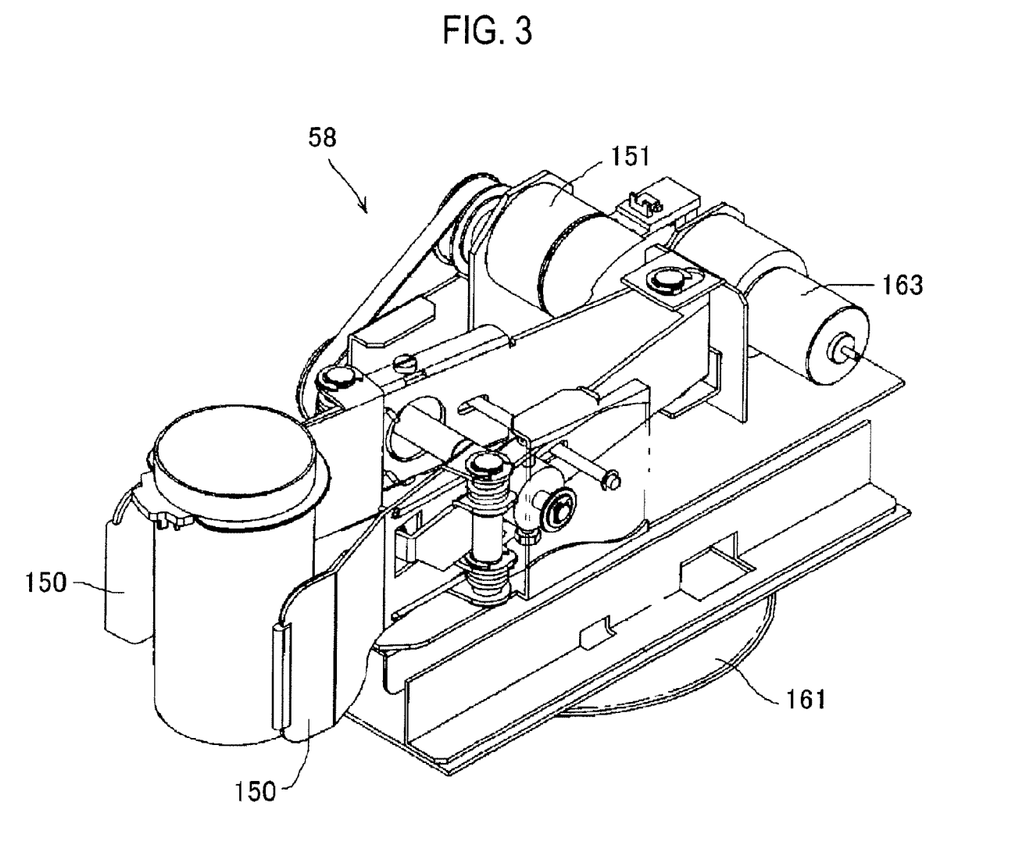
FIG. 3 is a perspective view showing a drive part of the vial arranging device according to the present invention.
Figure 4:
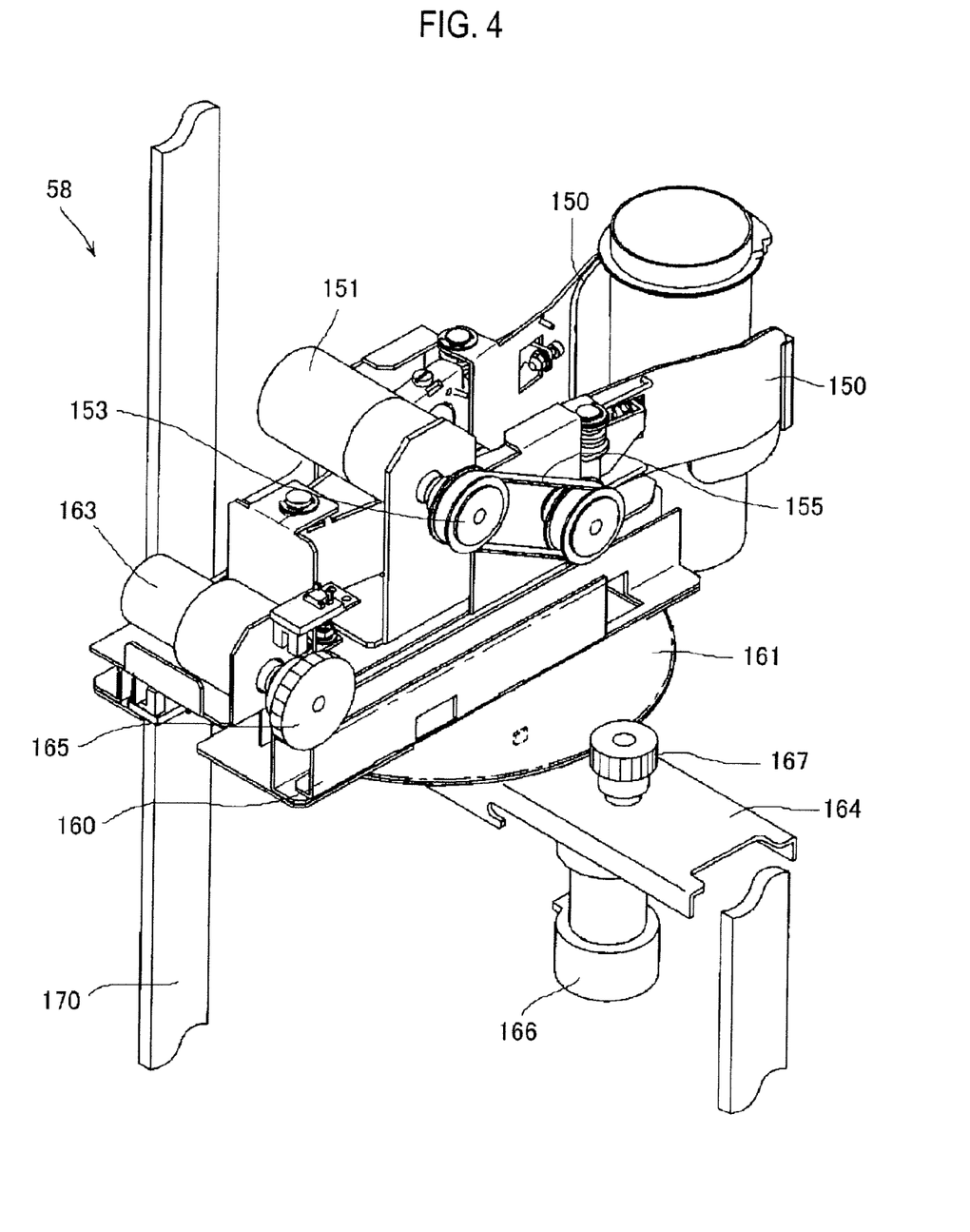
FIG. 4 is a perspective view showing that the drive part of FIG. 3 is inverted.
Figure 5:
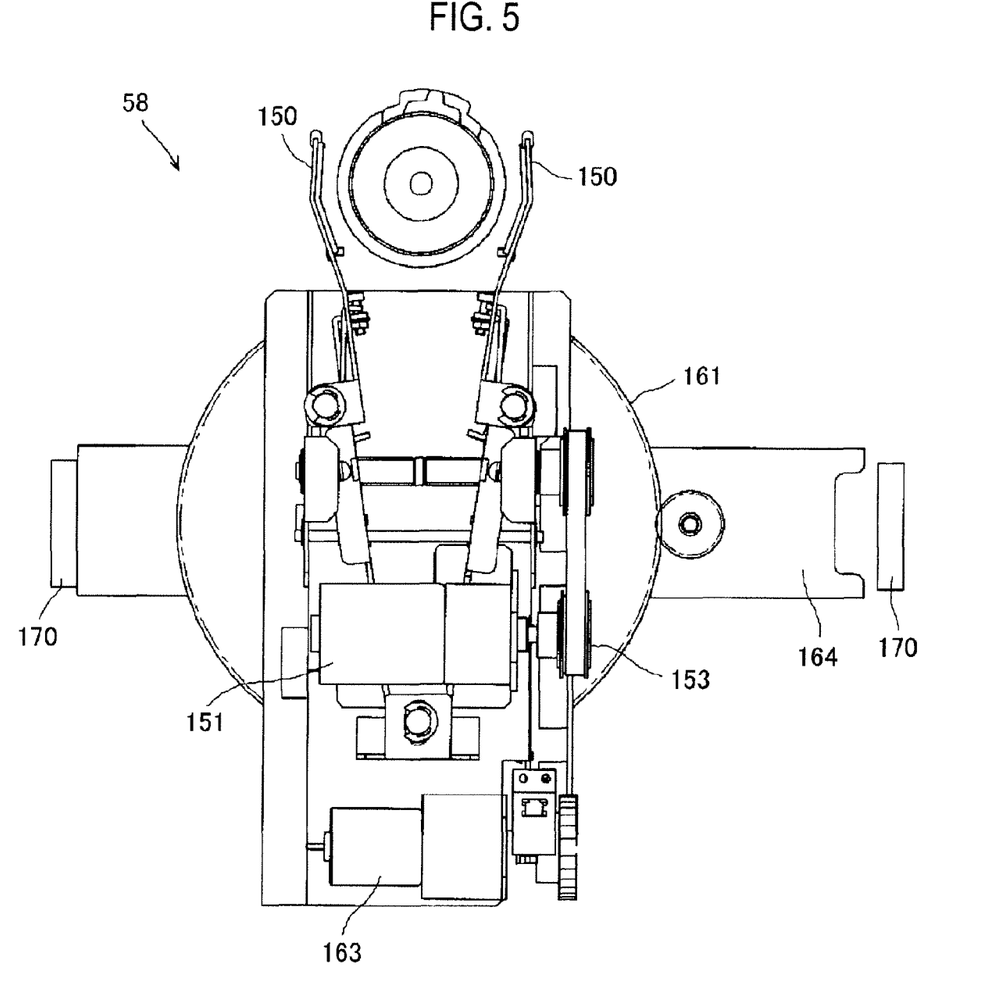
FIG. 5 is a plan view showing the drive part of the vial arranging device shown in FIG. 3.

The vial arranging device 58 will be described in detail below. FIG. 2 shows the configuration of the vial arranging device according to the present invention. FIG. 3 is a perspective view showing a drive part of the vial arranging device according to the present invention. FIG. 4 is a perspective view showing that the vial arranging device shown in FIG. 3 is inverted. FIG. 5 is a plan view showing the drive part of the vial arranging device shown in FIG. 3.

As shown in FIG. 2, the vial arranging device 58 includes a data managing part 39, the control part 40 and the drive part 41. The vial arranging device 58 receives the vial 1 from the vial transferring device (the vial grasping part 57) and then carries the vial to the keep shelf 202 (vial arranging section) to arrange the same. The drive part 41 of the vial arranging device 58 has a pair of arms 150 (arm part). A ball screw (not shown) is fitted to the arms 150. Rotation of the ball screw allows the arms 150 to be opened or closed. In this embodiment, an arm opening and closing motor 151 is provided and a power therefrom is transmitted via a pulley 153 and a belt 155. Thereby, the ball screw is rotated and the arms 150 are opened or closed accordingly. Further, the arms 150 are placed on a slide rail (not shown) and the slide rail is mounted on a turn base 161. The turn base 161 is mounted on a lifting and lowering table 164.

The arms 150, which are placed on the slide rail as described above, linearly travel along the slide rail. Further, a rack 160 is provided parallel with the slide rail. A traveling motor 163 is attached to a frame that holds the arms 150. A gear 165, which is coupled to a rotating shaft of the traveling motor 163, meshes with the rack 160. Thus, as the traveling motor 150 rotates, the gear 165 is rotated to linearly move the arms 150 along the slide rail.

The turn base 161 has a shape of a circular disk and is rotatably supported on the lifting and lowering table 164. The turn base 161 has gear teeth around its periphery. Further, a turning motor 166 is attached to the lifting and lowering table 164 and a gear 167 attached to the turning motor 166 meshes with the gear teeth of the turn base 161. Accordingly, if the turning motor 166 rotates, then the turn base 161 rotates. A rotary angle of the turning motor 166 is controlled by the control part 40 described below. The lifting and lowering table 164 is attached to a perpendicular rail 170 that is vertically erected. The lifting and lowering table is vertically lifted or lowered by means of a toothed belt (not shown).

As shown in FIG. 2, the data managing part 39 of the vial arranging device 58 includes a memory 43 and a CPU 44. The control part 40 includes a memory 45 and a CPU 46. The memory 43 of the data managing part 39 may store in advance a map, wherein the number of the vials 1 to be arranged in the keep shelf 202 and a layout (arrangement pattern) corresponding to the number of the vials 1 to be arranged are matched to each other. Further, the memory 43 may store an inputted prescription data (e.g., name of medicine, amount, kinds, patient's name, etc.). The CPU 44 of the data managing part 39 computes the number of necessary vials 1 from the prescription data acquired from a user server 10. The CPU 46 of the control part 40 determines the keep shelf 202 in which the vials 1 are to be arranged. Further, the CPU of the control part reads out an arrangement pattern for the vials 1 in the keep shelf 202 (vial arranging section) (the arrangement pattern corresponding to the computed number of the vials 1) from the memory 45 and then controls the drive part 41 as described below. That is, the memory 45 stores the map (a correspondence table between the quantity of the vials 1 and the layouts for the vials 1) for the arrangement patterns depending upon the quantity of the vials 1. The drive part 41 receives the vial one at a time from the vial transferring device (the vial grasping part 57) and then arranges the vial in the keep shelf 202 in a sequential procedure described below.

Figure 7:
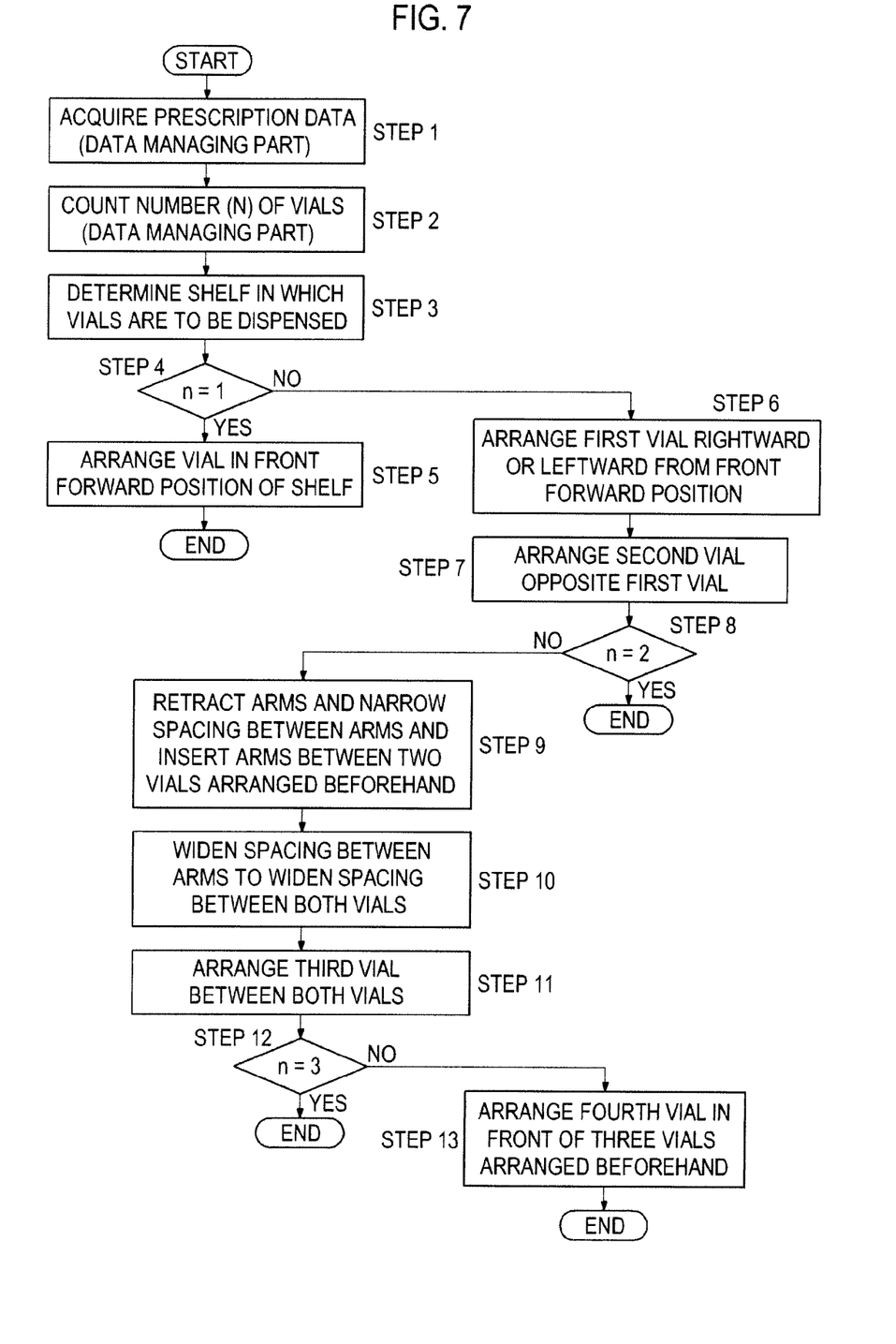
FIG. 7 is a flow chart showing a sequential procedure in arranging a vial in a keep shelf by the vial arranging device of the present invention.

The vial arranging device 58 is configured as described above. Next, an explanation will be provided on the sequential procedure for actually arranging the vial 1 in the keep shelf 202 using the vial arranging device 58. FIG. 7 is a flow chart illustrating the sequential procedure associated with arranging the vial in the keep shelf by the vial arranging device according to the present invention. FIGS. 8 to 13 are enlarged perspective views of the keep shelf (vial arranging section) of the medicine filling and dispensing apparatus, showing respectively how the vial is arranged in the keep shelf.

In Step 1 shown in FIG. 7, a prescription data that is made according to a doctor's diagnosis is transmitted to the data managing part 39 through a signal line or wirelessly and then the data managing part 39 acquires the prescription data and thereafter the procedure proceeds to Step 2. Also, the medicine supplying unit 203 fills the vial with medicines based on the prescription data acquired by the data managing part 39.

In Step 2, the data managing part 39 (the CPU 44) computes the quantity (n) of the vials 1 from the prescription data. Or, the data managing part 39 counts the quantity (n) of the used vials 1 based on the prescription data. The information on the computed or counted quantity (n) of the vials is sent from the data managing part 39 to the control part 40.

Subsequently, in Step 3, the CPU 46 of the control part 40 determines the keep shelf 202 in which the vial is to be arranged. The CPU 46 reads out the arrangement pattern corresponding to the quantity of the vials 1 from the map stored in the memory 45. In this embodiment, it is assumed that the capacity of the keep shelf 202 is sized such that four vials 1 can be arranged therein. Thus, when the number of the vials exceeds four, since all the vials 1 cannot be arranged in one keep shelf 202, the rest of the vials 1 are arranged in another keep shelf 202 (preferably, neighboring keep shelf). Hereinafter, an explanation will be first provided on a case where the number (n) of the vials 1 is not more than four (4). Thereafter, an explanation will be continued on another case where the number (n) of the vials 1 is more than four (4).

Figure 8:
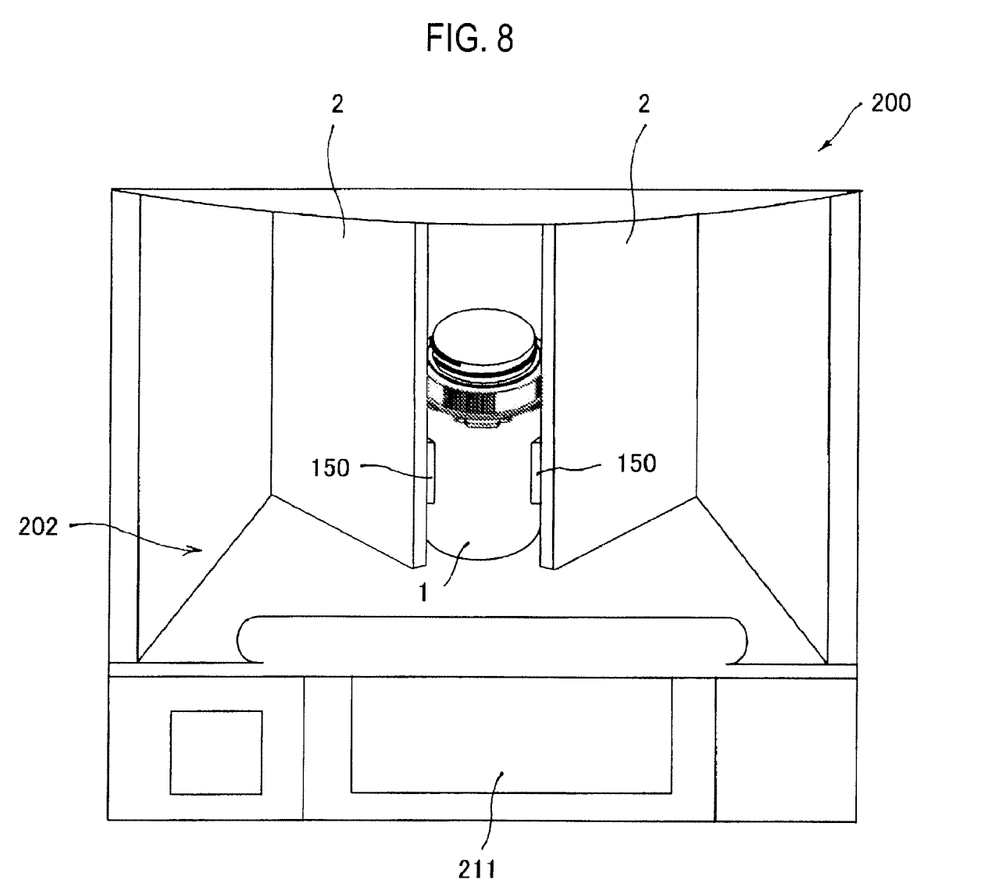
FIG. 8 is an enlarged perspective view showing the keep shelf (vial arranging section) of the medicine filling and removing device, wherein a first vial is arranged in the keep shelf while pushing and opening doors.
Figure 9:
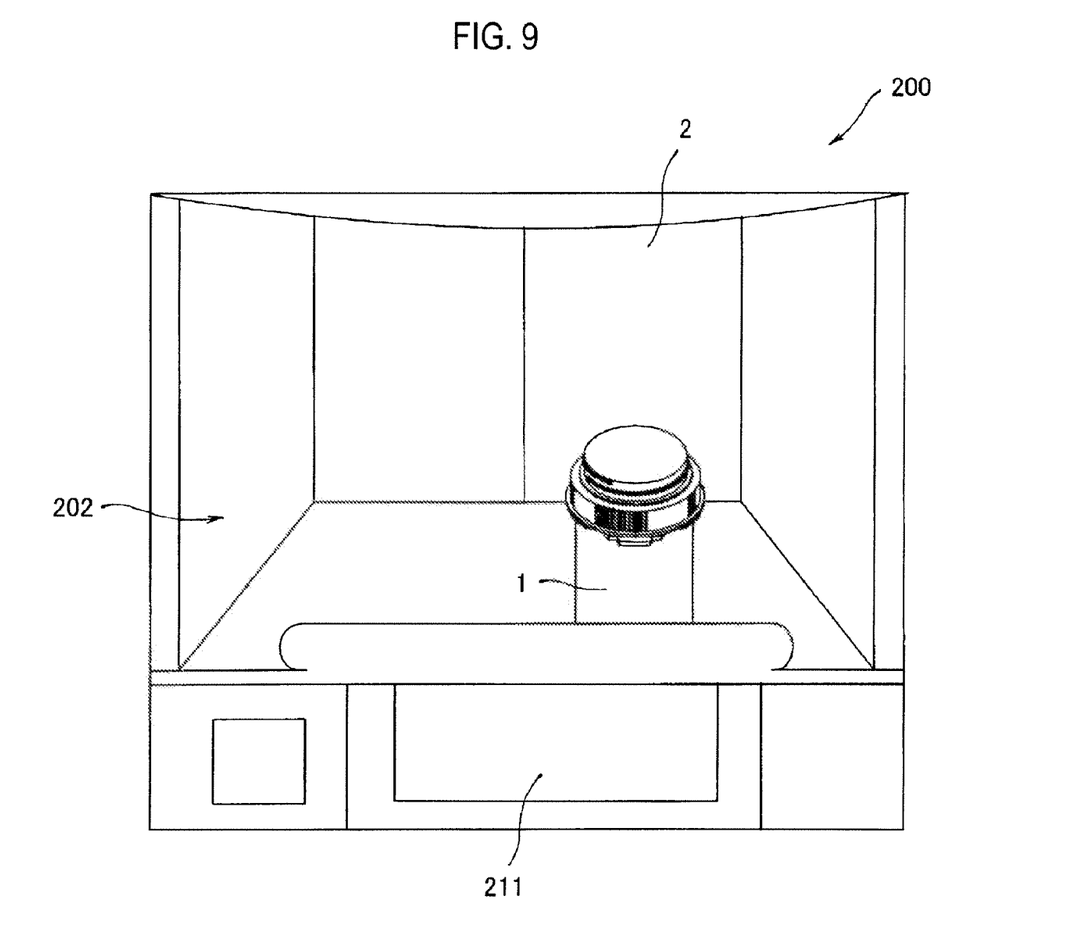
FIG. 9 is an enlarged perspective view showing the keep shelf of the medicine filling and dispensing apparatus wherein the vial of FIG. 8 is arranged.
Figure 10:
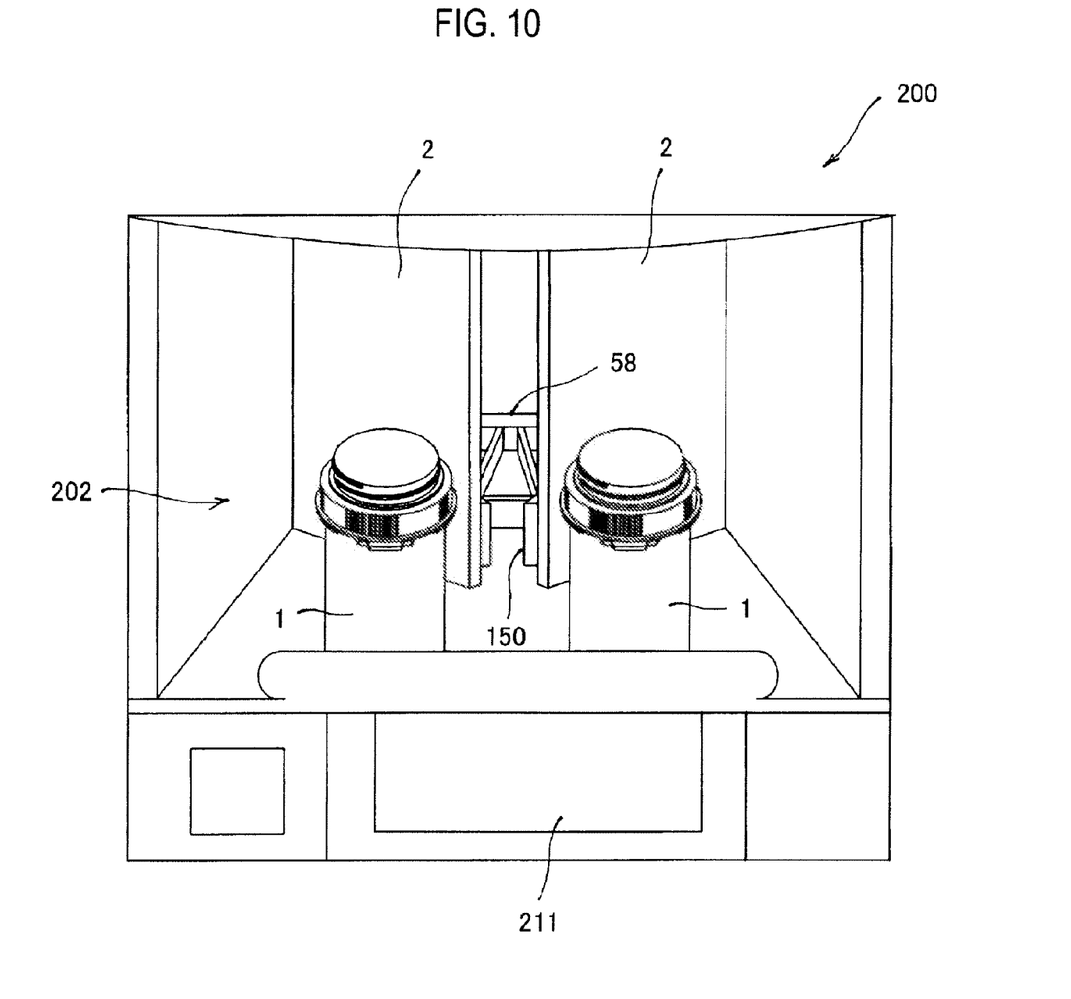
FIG. 10 is an enlarged perspective view showing the keep shelf of the medicine filling and dispensing apparatus wherein two vials are arranged.
Figure 11:
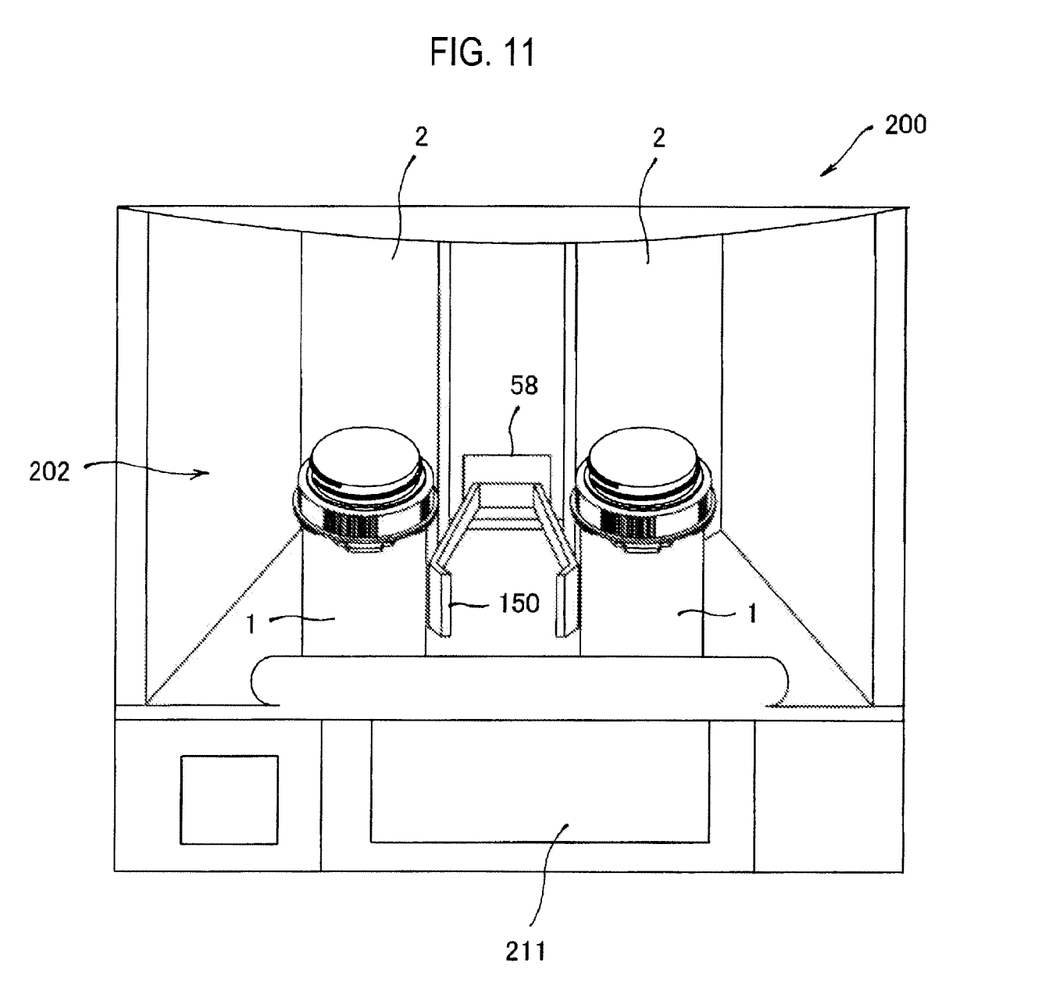
FIG. 11 is an enlarged perspective view showing when spacing between two vials of FIG. 10 is widened.

In step 4, it is judged whether the vial 1 is one (1) or not. Where the vial 1 is one (1), the procedure proceeds to Step 5. As shown in FIG. 8, the vial arranging device 58 (the arms 150) pushes and opens the doors 2 as sandwiching the vial 1 therein. And, as shown in FIG. 9, the vial arranging device arranges the vial 1 in the keep shelf 202. Consequently, serial operations after acquiring the prescription data are finished. FIG. 9 illustrates that the vial 1 is rightward arranged in the keep shelf 202. It is preferred that the vial 1 is arranged in a central position of the keep shelf 202 where n=1.

In Step 4, if the vial 1 is not less than two (2) (where "NO" in Step 4), the procedure proceeds to Step 6. In Step 6, a first vial to be arranged in the keep shelf 202 is arranged in a rightward position (it can be arranged in a leftward position) as shown in FIG. 9. That is, the vial arranging device 58 (the control part 40) turns the turn base 161 at a predetermined angle and then places the vial 1 in at a location rightward from the central position of the keep shelf 202.

Further, in Step 7, in order that a second vial 1 may not collide with the first vial 1 placed beforehand, the control part 40 turns the turn base 161 at a predetermined angle in an opposite direction (toward the left) and then places the second vial near the first vial 1 with a certain spacing therebetween. The aforesaid certain spacing is sized such that the two arms 150 with their spacing narrowed can be inserted to the spacing. When Step 7 is finished, two vials 1 stand side by side in the keep shelf 202 from an operator's view, thereby being under a easy removal state.

Next, in Step 8, it is judged whether the number (n) of the vial 1 is two (2) or not. Where two (2), arranging the vial 1 is finished. Further, where the vial 1 is not less than three (3) (where "NO" in Step 8), the procedure proceeds to Step 9.

In Step 9, after the second vial 1 is completely placed, the arms 150 are retracted and then the control part 40 turns the turn base 161 such that the arms 150 is directed to the central position of the keep shelf 202. Further, the control part 40 narrows the spacing of the arms 150 and insert the arms between the two vials 1 arranged in the keep shelf 202.

Next, in Step 10, the control part 40 widens the spacing between both arms 150 (see FIG. 11) to widen the spacing between the left and right vials 1 by both of the arms 150. Thereafter, the control part narrows the spacing of the arms 150 and retracts the arms 150. Then, the arms 150 are allowed to hold the third vial 1.

Figure 12:
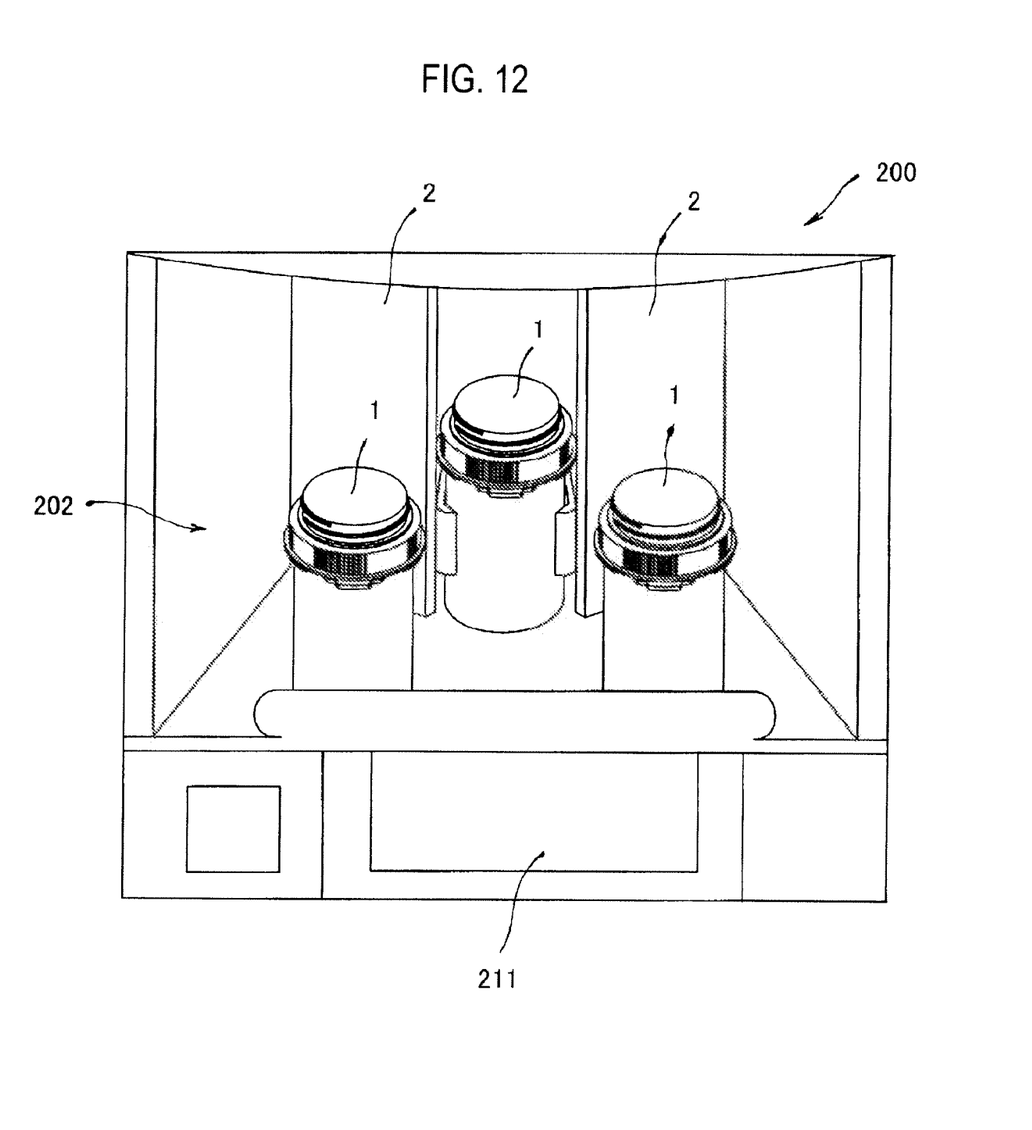
FIG. 12 is an enlarged perspective view showing the keep shelf of the medicine filling and dispensing apparatus wherein a third vial is arranged.

Subsequently, in Step 11, the arms arrange a third vial 1 between the two vials 1 arranged beforehand as shown in FIG. 12. When such an arrangement is viewed from an operator, three vials 1 are arranged in a horizontal row in the keep shelf 202.

As described above, the control part 40 appropriately changes the advancement and retraction direction of the arms 150 or inserts the arms 150 between the two vials 1 arranged beforehand and then opens the arms 150 to widen the spacing between both of the vials 1. Thus, the layout of the vial 1 in the keep shelf 202 can be changed. Accordingly, the vial arranging device 58 can efficiently arrange the vial 1 in the keep shelf 202 based on the prescription data according to the number (n) of the vials 1 to be arranged in the keep shelf 202.

Three vials 1 are arranged in the keep shelf 202 in the foregoing procedure. In step 12, the control part 40 judges whether a fourth vial is to be arranged or not. That is, it is judged whether the number (n) of the vials 1 is three (3) or not. Where n=3, arranging the vial 1 is finished. Further, where the vial 1 is more than three (where "NO" in Step 12), the procedure proceeds to Step 13.

Figure 13:
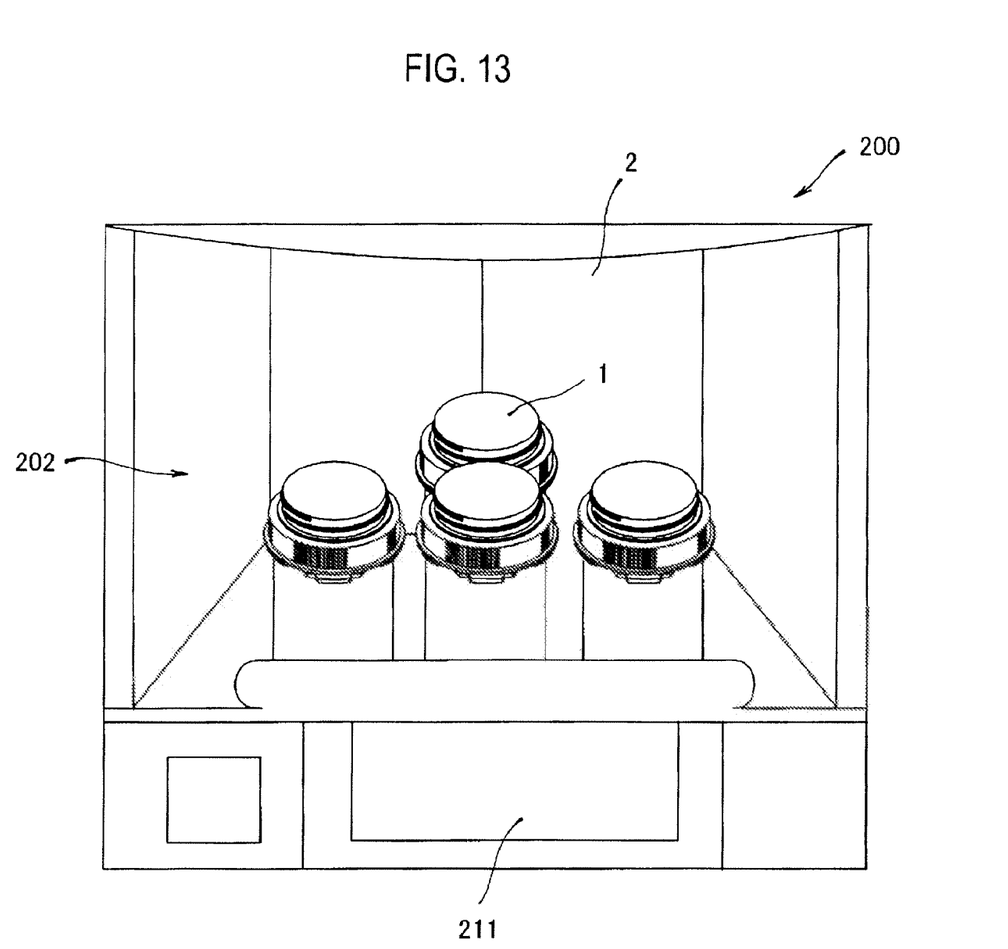
FIG. 13 is an enlarged perspective view showing the keep shelf of the medicine filling and dispensing apparatus wherein a fourth vial is arranged.

In Step 13, a fourth vial 1 is arranged in front of the three vials 1 that are completely arranged (inwardly of the medicine filling and dispensing apparatus 200) as shown in FIG. 13. The keep shelf 202 defines a substantially fanlike placement plane with a narrow width inwardly of the medicine filling and dispensing apparatus 200 and a wider width outwardly of the medicine filling and dispensing apparatus. Further, the doors 2 are provided at a portion of the keep shelf 202 that is inwardly of the medicine filling and dispensing apparatus 200. Four vials 1 at maximum can be arranged without any contact to the doors 2 in one keep shelf 202.

More than four vials 1 may be filled with medicines. When more than four vials 1 are filled with medicines, four vials 1 are first arranged in a first keep shelf 202 and thereafter the rest of the vials 1 are arranged in a second keep shelf 202. Arranging the rest of the vials 1 in the second keep shelf 202 is performed through the steps subsequent to Step 2 in FIG. 7. In the steps subsequent to Step 2 in FIG. 7, the data managing part 39 counts the number (n) of the rest of the vials 1. For example, in case there are total six vials 1 filled with medicines, since the remaining two vials 1 (by subtraction of four vials from six vials) are arranged in the second keep shelf 202, the procedure goes till Step 8 and is then finished through "YES".

More specifically, in case the medicines prescribed according to a doctor's prescription cannot be handled without using not less than five vials 1, a step (not shown) is performed for determining a new keep shelf in which the rest of the vials 1 is to be arranged. In such a case, it is preferable to select a neighboring keep shelf. For example, when all of the keep shelves are already filled with the vials, a display panel 210 provided in the vial arranging device 58 displays an error, thereby calling an operator's attention. As a result, the operator removes the vials arranged in one of the keep shelves 202 to empty such keep shelf and thereby the rest of the vials 1 can be arranged.

The display panel 210 and a shelf indicator 211 are provided in the medicine filling and dispensing apparatus 200, as shown in FIG. 1. The display panel 210 and shelf indicator 211 display the name of the medicines accommodated in the vials 1 that are situated in the keep shelf 202, a name of a patient to whom the vials are distributed, the quantity of the rest of the vials to be discharged, etc. That is, based on the prescription data transmitted from the user server, the control part 40 outputs the name of the medicines accommodated in the vials 1 that are situated in the keep shelf 202, the name of a patient relevant thereto, etc. to the display panel 210 or the shelf indicator 211. Thus, the operator can hand over the vials 1 supplied according to the prescription to the relevant patient without any mistake. That is, the vials, which are filled with medicines related to other prescriptions, may not be arranged in the same keep shelf. Thus, mishandling caused by the operator is difficult to occur. In particular, in case the shelf indicator 211 provided in each of the keep shelves 202 includes a fluorescent display tube capable of displaying alphabet characters, the name of the relevant patient can be displayed in a position closest to the vial and the operator can verify the name. Thus, mistakes associated with removal from the keep shelf can be greatly decreased.

It is described in this embodiment that the number of the vials to be arranged in the keep shelf 202 is four (4) at maximum. When there is a need to use five vials or more, however, the rest of the vials 1 can be arranged by determining another keep shelf 202 to be a arrangement location for the rest of the vials 1 through the step (not shown) for determining another keep shelf for use to arrange the rest of the vials. As another method other than the foregoing, when the number of the vials to be arranged comes to a predetermined number for one keep shelf 202, the display panel 210 or the shelf indicator 211 may display an error, thereby notifying the operator of the necessity of the second keep shelf. Further, the display panel 211 or the shelf indicator 211 may display the quantity of the rest of the vials 1 along with the aforesaid error display. That is, the vial arranging device according to the present invention may optionally decide a method of selecting the keep shelf or a method of displaying information to the operator according to user's needs. Accordingly, the vial arranging device should not be limited to the foregoing embodiment.

The invention claimed is:

1. A medicine filling and dispensing apparatus, comprising:
   a plurality of vial arranging sections in which a plurality of vials filled with medicines are arranged; and
   a carrying means including an arm member for sandwiching one vial of the plurality of vials, the carrying means carrying the vial sandwiched by the arm member to a first vial arranging section of the plurality of vial arranging sections, the carrying means advancing the arm member to the first vial arranging section and placing the vial in the first vial arranging section,
   wherein a layout of the vials in the first vial arranging section is set according to a number of the vials to be carried into the first vial arranging section.

2. The medicine filling and dispensing apparatus of claim 1, wherein the carrying means is configured to advance and retract the arm member in the first vial arranging section in at least two or more directions or the carrying means is configured to advance and retract the arm member and to move the arm member in right and left directions in the first vial arranging section.

3. The medicine filling and dispensing apparatus of claim 2, wherein the at least two or more directions include a central direction in the first vial arranging section and another direction other than the central direction.

4. The medicine filling and dispensing apparatus of claim 1, wherein the vials arranged beforehand are moved by changing a spacing of the arm member.

5. The medicine filling and dispensing apparatus of claim 1, wherein when the first vial arranging section does not receive all of the vials filled with medicines of a same prescription, a second vial arranging section of the plurality is used.

6. The medicine filling and dispensing apparatus of claim 1, wherein the vials filled with medicines related to other prescriptions are not mingled in the same vial arranging sections of the plurality as one another.

7. The medicine filling and dispensing apparatus of claim 1, further comprising a computing means for acquiring a prescription data and computing the quantity of vials needed to be filled with medicines.

8. The medicine filling and dispensing apparatus of claim 1, further comprising a storing means for storing a vial layout corresponding to the number of vials to be arranged in the first vial arranging section and a sequential procedure for arranging the vials by the vial layout.

9. A method of arranging vials in a vial arranging section of a medicine filling and dispensing apparatus, the method comprising:
   carrying a first vial to the vial arranging section by an arm member sandwiching the first vial;
   arranging a second vial next to a third vial in the vial arranging section;
   inserting the arm member with a spacing thereof narrowed between the second and third vials;
   spreading the arm member to space apart the second and third vials; and
   arranging the first vial between the second and third vials.

* * * * *